Sept. 15, 1953  C. G. MENARD ET AL  2,651,832
MACHINE FOR FINISHING PISTONS
Filed Jan. 16, 1951  9 Sheets-Sheet 1

INVENTORS
CLIFFORD G. MENARD
JOHN J. McCABE
BY Diker Sanborn
ATT'YS.

Sept. 15, 1953   C. G. MENARD ET AL   2,651,832
MACHINE FOR FINISHING PISTONS
Filed Jan. 16, 1951   9 Sheets-Sheet 2

INVENTORS
CLIFFORD G. MENARD
JOHN J. McCABE
BY Dike + Sanborn
ATT'YS.

Sept. 15, 1953    C. G. MENARD ET AL    2,651,832
MACHINE FOR FINISHING PISTONS
Filed Jan. 16, 1951    9 Sheets-Sheet 3

INVENTORS
CLIFFORD G. MENARD
JOHN J. McCABE
BY Dike + Sanborn
ATT'YS.

Sept. 15, 1953     C. G. MENARD ET AL     2,651,832
MACHINE FOR FINISHING PISTONS
Filed Jan. 16, 1951     9 Sheets-Sheet 4
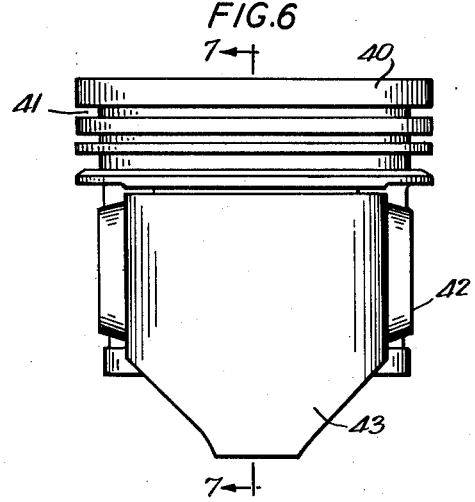
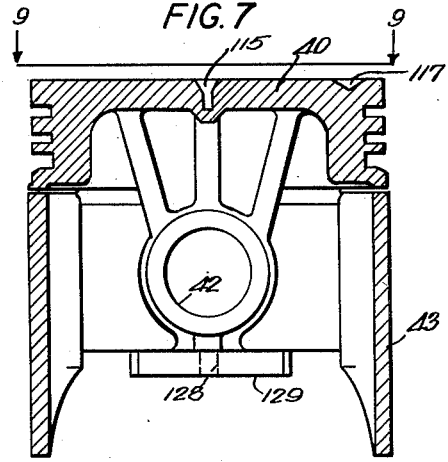
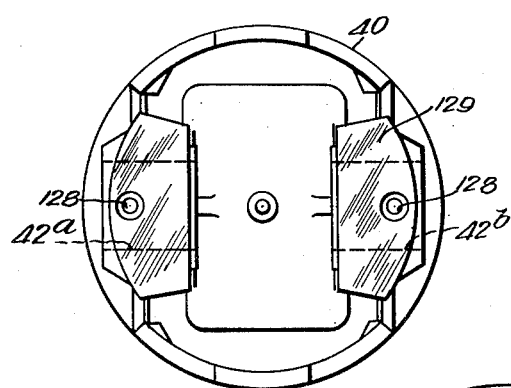
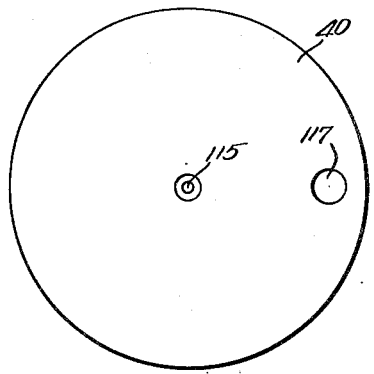
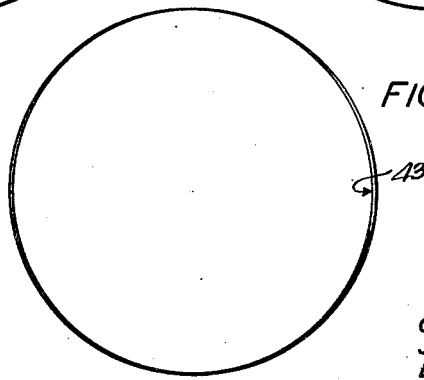
INVENTORS
CLIFFORD G. MENARD
JOHN J. McCABE
BY Dike + Sanborn
ATT'YS.

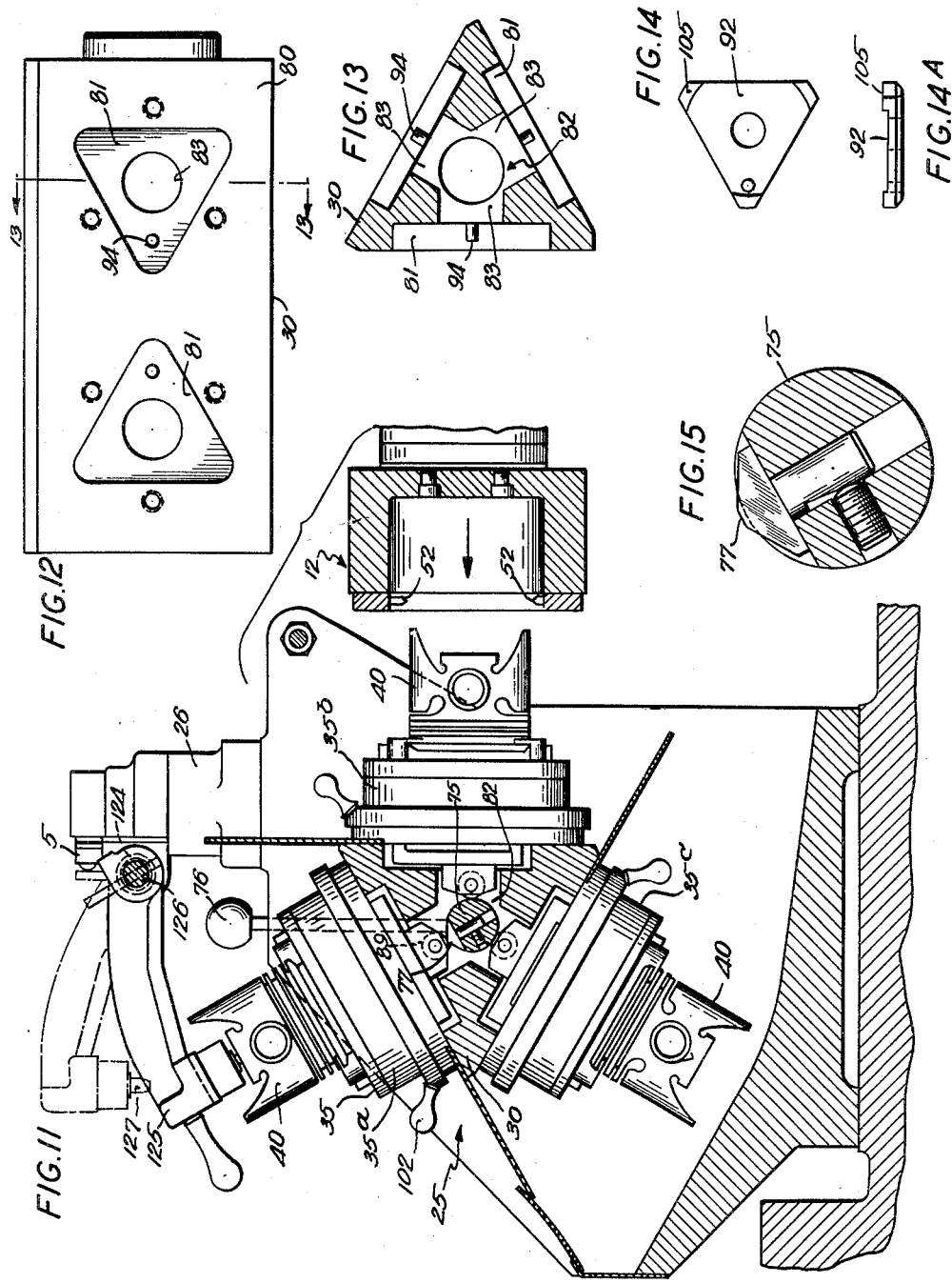

Sept. 15, 1953　　　C. G. MENARD ET AL　　　2,651,832
MACHINE FOR FINISHING PISTONS
Filed Jan. 16, 1951　　　　　　　　　　　　　　　　9 Sheets-Sheet 6
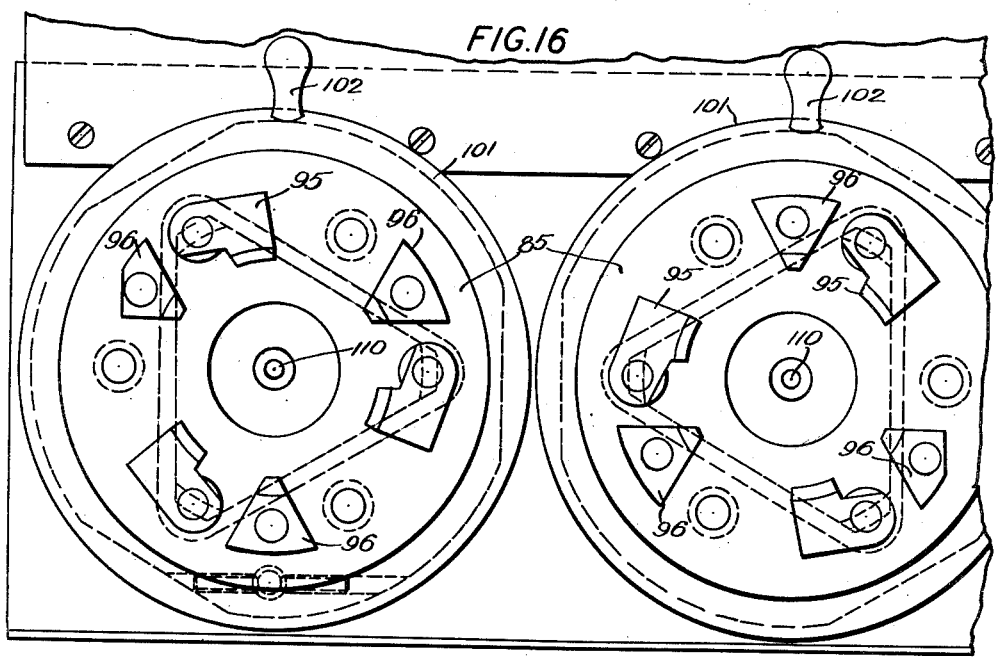
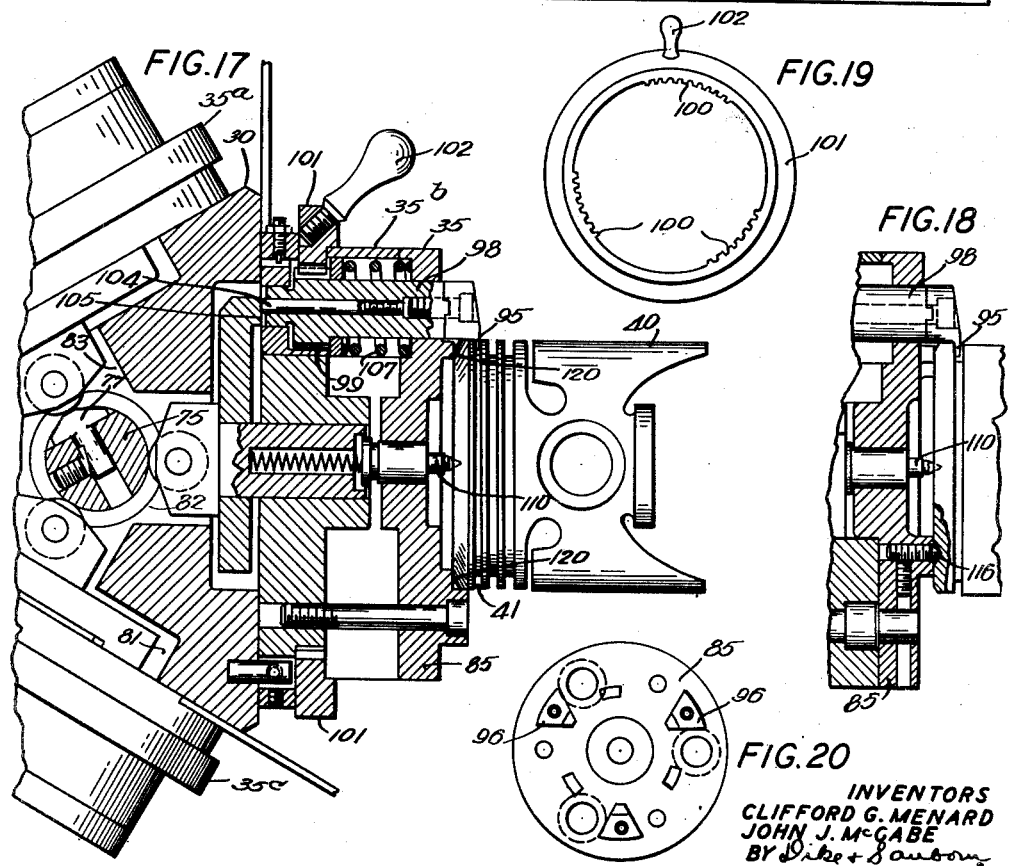
INVENTORS
CLIFFORD G. MENARD
JOHN J. McCABE
BY Dike + Sawbern
ATTYS.

Sept. 15, 1953  C. G. MENARD ET AL  2,651,832
MACHINE FOR FINISHING PISTONS
Filed Jan. 16, 1951  9 Sheets-Sheet 7
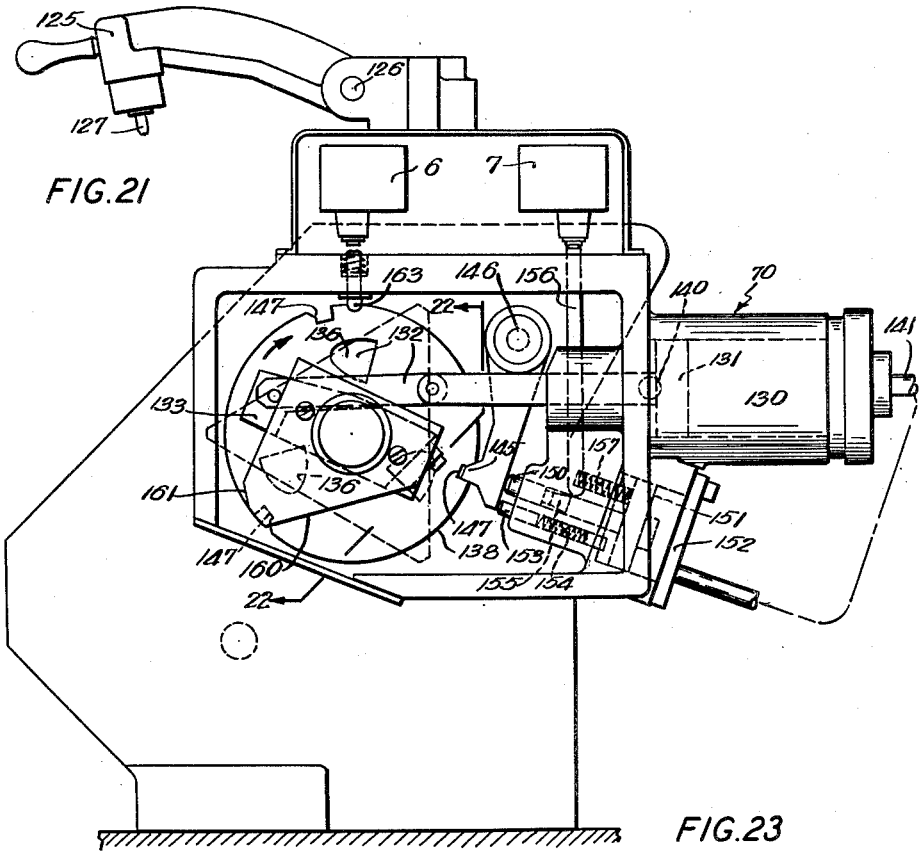
FIG.21
FIG.23
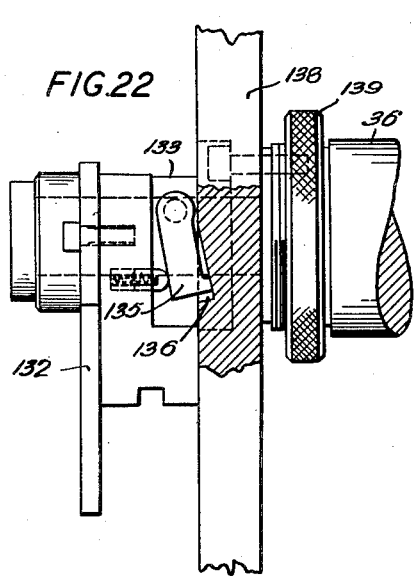
FIG.22
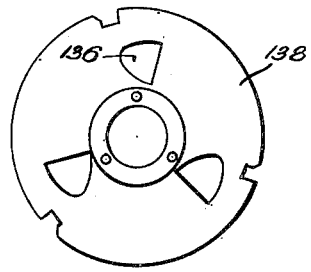
INVENTORS
CLIFFORD G. MENARD
JOHN J. McCABE
BY Dike + Sanborn
ATT'YS.

Sept. 15, 1953     C. G. MENARD ET AL     2,651,832
MACHINE FOR FINISHING PISTONS
Filed Jan. 16, 1951                     9 Sheets-Sheet 8

INVENTORS
CLIFFORD G. MENARD
JOHN J. McCABE
BY Dike + Sanborn
ATT'YS.

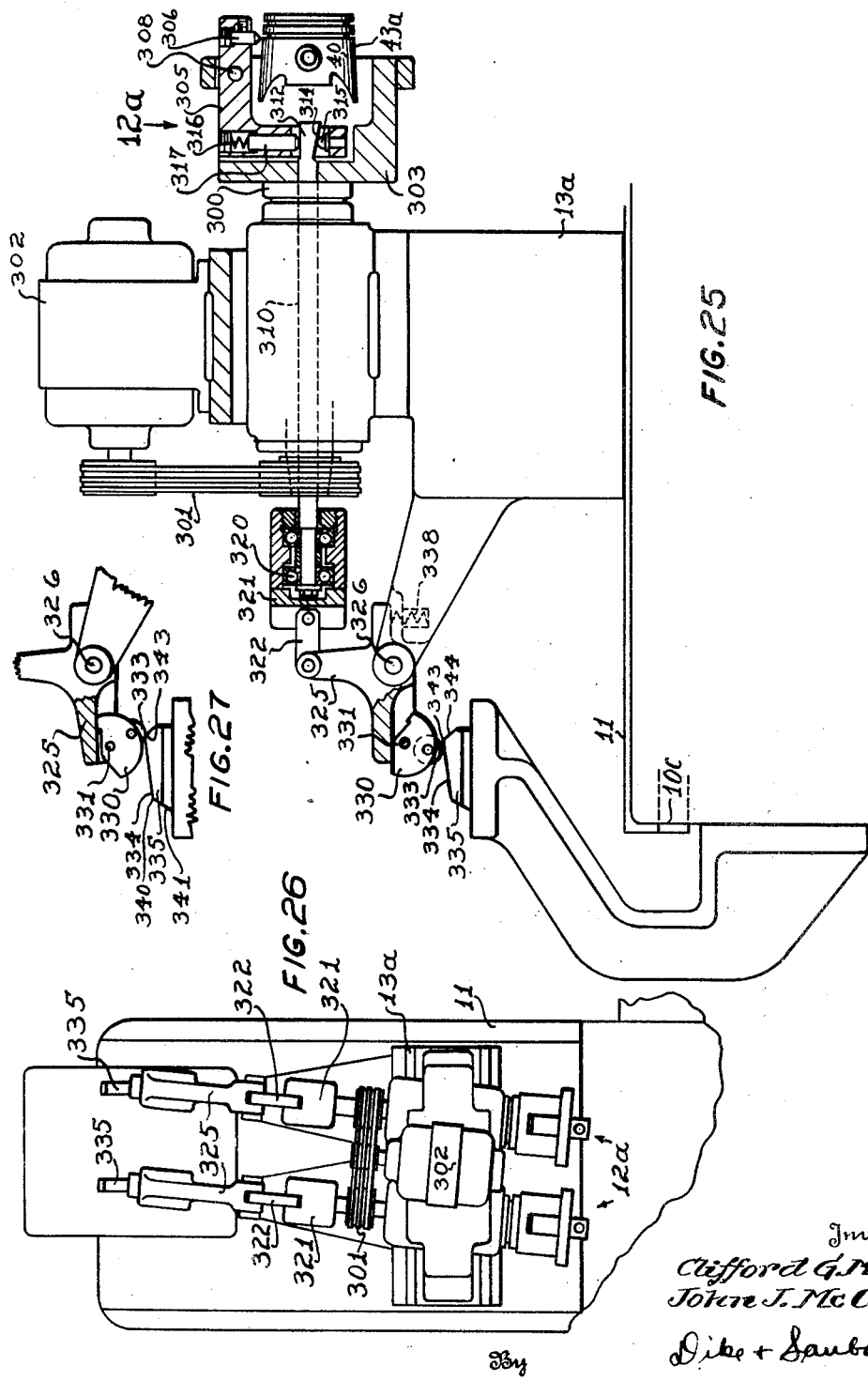

Patented Sept. 15, 1953

2,651,832

UNITED STATES PATENT OFFICE 2,651,832

MACHINE FOR FINISHING PISTONS

Clifford G. Menard, Shrewsbury, and John J. McCabe, Worcester, Mass., assignors to The Heald Machine Company, Worcester, Mass., a corporation of Massachusetts Application January 16, 1951, Serial No. 206,214

3 Claims. (Cl. 29—38)

This invention relates to a machine for producing the peripheral surface and also the wrist pin hole in pistons of the type generally used in internal combustion engines and particularly to a machine in which these operations are automatically performed on a succession of piston blanks.

In finish machining the major periphery or outside surface of a piston of this type, it is customary to place the piston in a machine which is equipped to rotate a turning tool about an axis and in contact with the piston surface. If a cylindrical surface is desired as in the older types of pistons, the tool rotates around the major axis of the piston and is also fed parallel to that axis to generate a finished cylindrical surface. More recently it has become desirable to form a peripheral surface which has a slightly elliptical cross section normal to the axis of the piston. This is accomplished by inclining the turning axis of the tool to the axis of the piston and then feeding the tool parallel to the piston axis, the tool thereby describing an intersection between two inclined cylinders when in contact with the piston surface and therefore generating an elliptical surface. Such elliptical peripheries are particularly desirable in the modern, light, cut-away, high speed type of piston for the purpose of improving the bearing surfaces between the piston and its cylinder and also to provide for expansion of the skirts of the piston when it is subject to the high temperatures of operation. A machine for generating an ellipitical periphery is shown and described in the patent to Snader No. 2,121,934.

The interior surface of the parts of a piston's wrist pin hole, the axis of which is disposed generally in a plane at right angles to the axis of the peripheral surface of the piston, is customarily finished in a separate precision boring machine in an operation which is entirely separate from that of machining the peripheral surface, these operations being performed in either order. It is extremely important that the wrist pin hole be located with extreme accuracy with respect to the finished peripheral surface of the piston. Therefore, in carrying out the usual successive operations as above described, some means must be provided to orient the piston both with respect to the peripheral surface to be produced and also with respect to the finished wrist pin hole. Thus, the piston must be positioned with respect to some reference surface both in turning the periphery and in boring the pin hole. This means that the piston must be very accurately positioned twice which consumes time and labor. Furthermore, location by one or more reference surfaces introduces errors due to the tolerances of the surfaces, due to variable compression of the surfaces when the piston is clamped and due to chips on the locating surfaces. Time is consumed in locating, orienting, and clamping the piston for each operation, and this time is still greater in case the hole is bored off center with respect to the piston axis which has become common practice. These errors vary from one piece to another due to tool wear and also distortion of the piece due to temperature differentials. Therefore, even with the most accurate, tedious and time consuming procedure in orienting the piston first with respect to one machine and then with respect to the next for the two separate operations, the inaccuracies in the relationship between the finished peripheral surface and the internal surface of the finished wrist pin hole cannot, under the customary practice, be controlled within the narrow tolerances desired in the fabrication of the modern lightweight, cutaway, high speed type of pistons being used in present day automotive and other internal combustion applications.

It is accordingly the object of this invention to provide a machine in which each of a succession of pistons can be rapidly and accurately positioned once, then turned and bored in an automatic cycle in which the peripheral surface and wrist pin hole formed bear an accurate predetermined spaced and angular relation to each other and in which finished pistons can be replaced by new workpieces, while others are being turned and bored.

In the drawings showing a preferred form of machine:

Fig. 5 is an elevation view of part of the mechanism at the back of the machine in Fig. 2;

Figs. 6 to 10 are various views of a workpiece, Fig. 10 being schematic to indicate the elliptical section of the finished peripheral surface turned by the machine;

Fig. 11 is an end view partly in section of the work clamping mechanism also shown in Figs. 1-3, and showing one of the turning tool heads;

Fig. 12 is a longitudinal view of part of the mechanism of Fig. 11;

Fig. 13 is a cross-section taken on line 13—13 of Fig. 12;

Fig. 14 is a face view of a piece included in the mechanism of Figs. 11 and 17;

Fig. 14a is an edge view of Fig. 14;

Fig. 15 is an enlargement of part of Fig. 11;

Fig. 16 is a side or longitudinal view of part of the mechanism of Fig. 11 showing details of the work clamps;

Fig. 17 is an enlarged detailed view of mechanism similar to Fig. 11;

Fig. 18 is a view of part of the mechanism of Fig. 17, but taken from a different angle;

Fig. 19 is a view showing part of the mechanism of Fig. 17;

Fig. 20 is a face view of a piece shown in Fig. 16;

Fig. 21 is an end view of the clamping mechanism somewhat similar to Figs. 11 and 17, also showing the indexing mechanism;

Fig. 22 is a view taken on the lines 22—22 of Fig. 21;

Fig. 23 shows details of a plate included in Fig. 21;

Figs. 25, 26 and 27 are side, top and partial detailed views of a modified form of turning tool which may be used for turning a tapered peripheral surface on a piston, which surface may also be elliptical.

General

Figure 1:
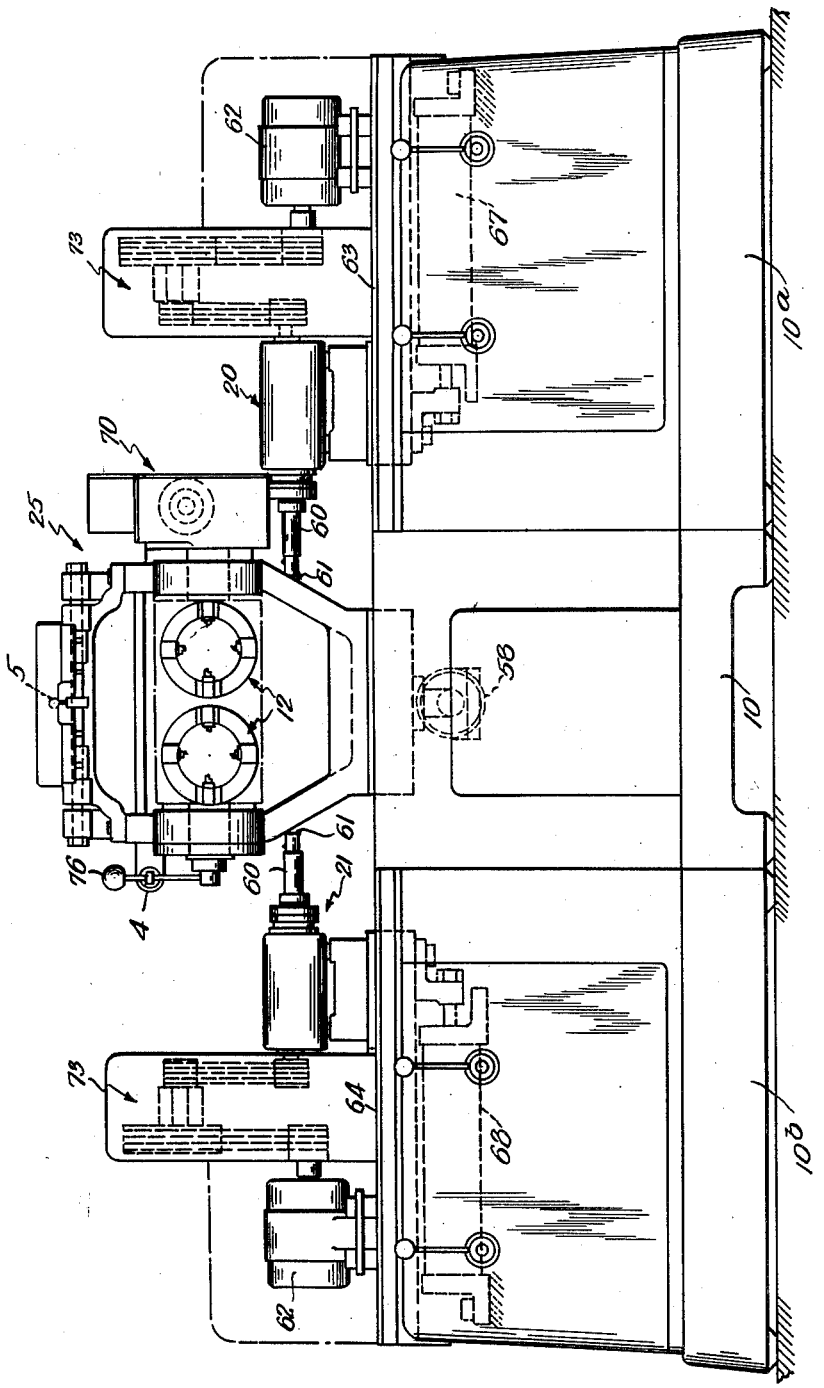
Fig. 1 is a general front view of the machine.
Figure 2:
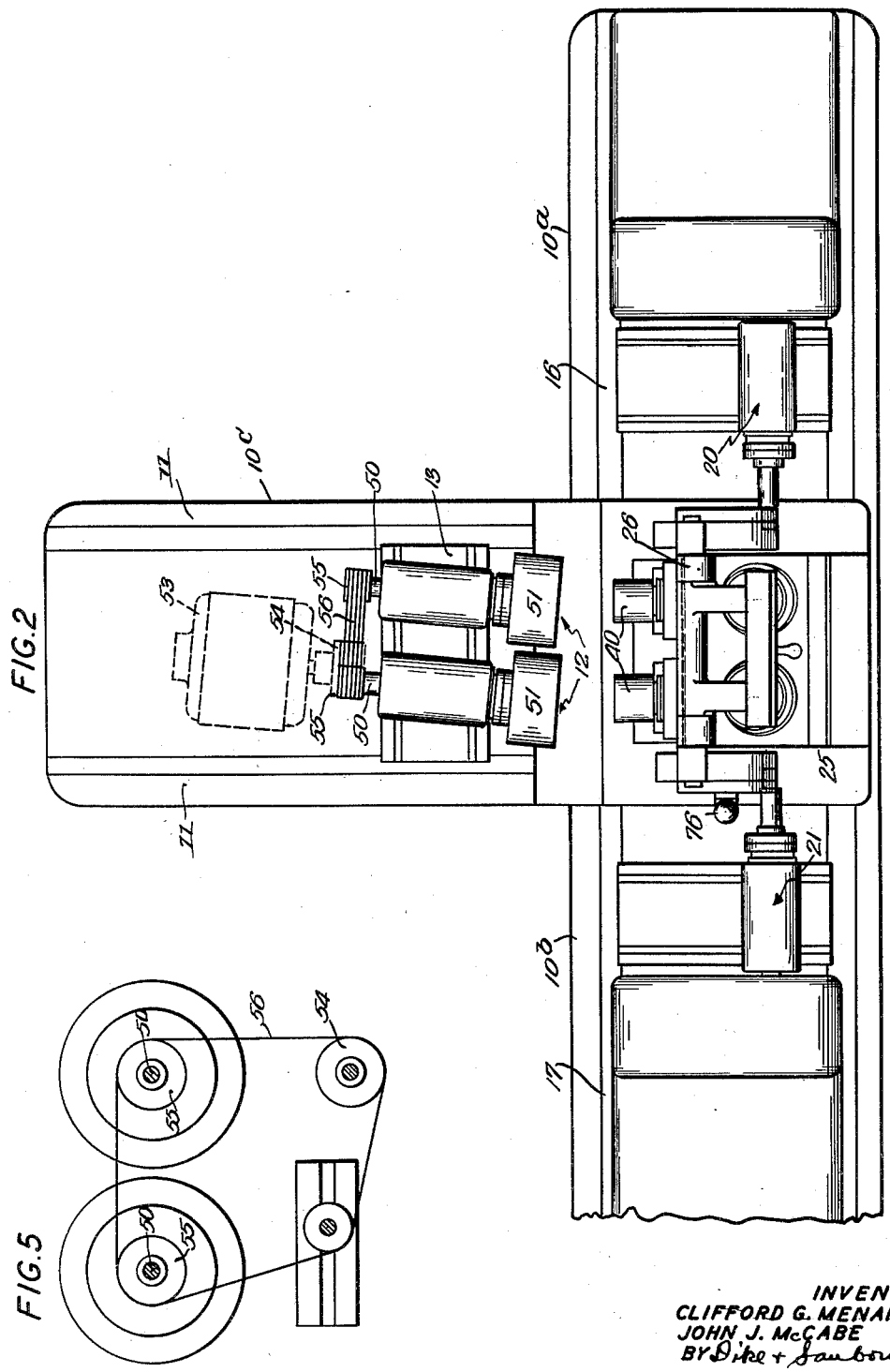
Fig. 2 is a general top plan view.

The machine illustrated in the general views of Figs. 1 and 2 comprises a plurality of circularly arranged pairs of piston clamping means which are progressively rotated step by step around an axis and successively presented to a loading position accessible to the operator and at which finished pairs of work pieces are replaced by new work pieces, and then to present pairs of work pieces first to a pair of turning tools for turning the peripheral surfaces and then to a pair of boring tools which bore the wrist pin holes, the latter operations being performed simultaneously on successive pairs of pistons while finished work pieces are being replaced by new work pieces.

The machine is organized on a T-shaped base 10 having right and left hand portions 10a and 10b, respectively, and a rear portion 10c. Slidably mounted on a pair of ways 11 on the rear portion 10c are a pair of turning tool heads indicated at 12 for turning the peripheral surfaces 43 of a pair of pistons 40, Figs. 6–10, these tools being mounted to feed together on a slide table 13. Mounted on slideways 16 and 17 on the front portions 10a and 10b of the bed are a pair of boring tool spindles indicated at 20 and 21 arranged to feed toward each other and to be retracted away from each other and with respect to a pair of work pieces 40 in operative position between them.

Referring to Figs. 1-4 and 11-23 mounted in a framework 26 which is located on the front and central portions of the bed 10 is a piston clamp mechanism indicated at 25 comprising a hub 30 which is journalled horizontally to rotate in suitable bearings 32 and 33 in the framework 26. Arranged at 120° intervals around the axis of rotation of the hub 30 are three pairs of piston clamps 35, one of each pair 35a, 35b and 35c being best seen in Figs. 11 and 17, the others being directly behind. These clamps are thus capable of holding and positioning three pair of pistons 40, two pair being in a loading position as illustrated by the clamps 35a, two pair being in a turning position as illustrated by the clamps 35b and the other pair being in a boring position as illustrated by the clamps 35c. Therefore, while the operator is replacing a finished pair of pistons by a new pair of work pieces at the loading position, another pair in the clamps 35b are in operative position with respect to the tool heads 12 and are being turned, and a third pair in the clamps 35c are in operative position with respect to the tool heads 20 and 21 and are being bored. After the completion of these simultaneous operations, the clamp mechanism 25 is rotated one 120° step, for instance, to place the pistons in the clamps 35a in the turning position, to place the pistons in the clamps 35b in the boring position and to return the pistons in the clamps 35c to the loading position so the finished pieces can be replaced by new work pieces. Means are provided to rotate the hub 30 and its assembly progressively clockwise as viewed in Figs. 11, 17 and 21 in 120° steps whereby a succession of raw work pieces may be fed to the tools and a succession of finished pieces removed at the loading and unloading stations, and the operation of the turning and boring tools and the step-by-step rotation of the hub 30 and its clamping assembly are automatic and in timed relation with each other and responsive to the loading of the raw work pieces, as further described.

Turning and boring tools

Referring to Figs. 1, 2, 11 and 24, the turning tool heads 12 comprise a pair of spindles 50 on the ends of which are mounted tool carrying cups or cages 51 adapted to encompass pistons 40 at the turning position and which carry cutting tools 52 mounted on their inner surfaces and disposed radially inwardly for engaging the peripheral surfaces of the pistons. The machine is arranged so that the table 13 upon which the tool heads 12 are mounted moves in and out along its slideway 11 in a direction parallel to the major axes of the pistons 40 when the latter are in turning position represented by the position of the clamps 35b.

However, for turning elliptical peripheries as is often preferable in modern practice, the turning tool spindles 50, i. e. the axes of rotation of the tools 52 are inclined to the major axes of the pistons 40 being turned and, therefore, to the direction of feed of the tools by an amount which may be of the order of 5° in order to form the desired peripheral surfaces having elliptical cross sections. The spindles may be rotatably driven by suitable power means, such as an electric motor 53 mounted on the slide 13 driving through pulleys 54 and 55 and belting 56, see also Fig. 5. The entire assembly on the table 13 including tools 52 is fed toward and away from the pistons 40 to engage and disengage the tools with the work by fluid pressure means including a piston 57 and a cylinder 58 suitably connected between the table 13 and bed 13c and indicated in Fig. 24, fluid pressure being supplied through lines 170 and 171 to operate the piston 57, as will be described.

It may also be desirable to turn tapered peripheries, either surfaces of revolution or elliptical surfaces, and for such purposes a modified form of the turning tool heads is indicated at 12a in Figs. 25-27, a tapered and elliptical peripheral surface being formed as indicated at 43a in a somewhat exaggerated form for illustrative purposes on a piston 40 positioned with respect to a tool head 12a. This device (there being a pair used in this machine) comprises a hollow spindle 300 journaled on a support 13a on a table 11 on the base 10c and driven as through belting 301 by a motor 302. On the end of the spindle 300 is mounted a cup or cage 303 which in turn supports a tool holder 305 in which is mounted the cutting tool 306, the holder 305 being pivoted at 308 to the cup 303. An endwise slidable rod 310 extending through and rotating with the spindle 300 carries a cam portion 312 having a cam surface 314 in contact with a cam follower element 315 on the tool carrier 305. A spring and push rod 316 and 317 in the carrier 305 serve to force the cam follower 315 in contact with the cam surface 314. Relative movement of the rod 310 to the left rocks the tool holder 305 counterclockwise as viewed in Fig. 25 thus increasing the diameter of the circle described by the tool 306 to allow turning of the larger portion of the taper; relative movement of the rod 310 to the right allowing the tool 306 to move toward its turning axis under pressure of the spring 316 to turn the diminished portion of the taper. As the turning tool 12a is fed toward the work to the right, the rod 310 is moved relatively to the right to decrease the diameter of the periphery toward the head of the piston 40. For this purpose the left end of the rod 310 rotates in thrust bearings 320 in a bearing member 321 connected by a pivot 322 to a bell crank 325 pivoted at 326 having a cam follower 330 pivoted at 331 and which may also have a cam roll 333 riding on the surface 334 of a cam 335 which is rigid with the bed 10c of the machine, the cam follower roll 333 being urged against the cam surface 334 by a spring 336. When the tool head 12a is in fully retracted position, the cam roll 333 drops over a corner 340 of the cam 335 formed by the intersection of a back surface 341 and the cam surface 334. This rotates the cam follower 330 clockwise so that it is in the position shown in Fig. 25 during which position of the follower 330 the cam roll 333 also rides in the cam surface 334 during feeding of the tool 306 toward the work. At the end of the feed of the tool toward the work to the right, the cam roll 333 drops over a corner 343 of the cam 335 and onto a steeply sloping front surface 344 which rocks the cam follower 333 counterclockwise into the position shown in Fig. 27 and in which position the cam follower remains during withdrawal of the tool 306 from the work as the cam roll 333 rides back over the cam surface 334. In the latter position of the cam follower 330 the bell crank 325 is allowed to drop slightly toward the cam surface 334 for any position of the tool head 12a relative to the cam 335 and, therefore, the tool 306 is retracted also radially from the work surface during the return stroke of the tool head 12a to the left so that actual cutting occurs only during the in-feed stroke. The pair of tool heads 12a are shown in Fig. 26 with their axes slightly offset to their direction of feed so that they turn peripheral surfaces which are elliptical as well as tapered.

Figure 3:
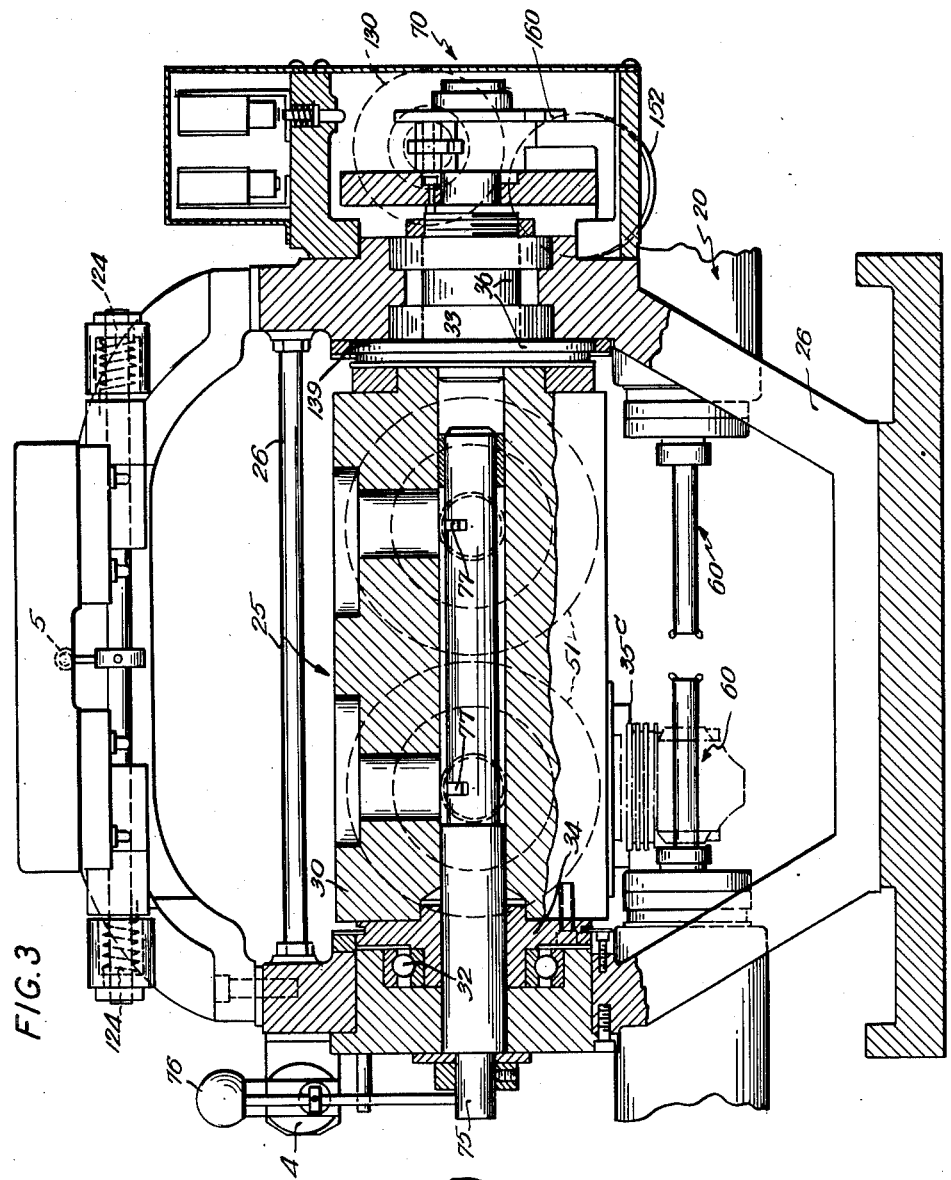
Fig. 3 is an enlarged view of a portion of Fig. 1, partly in section.
Figure 4:
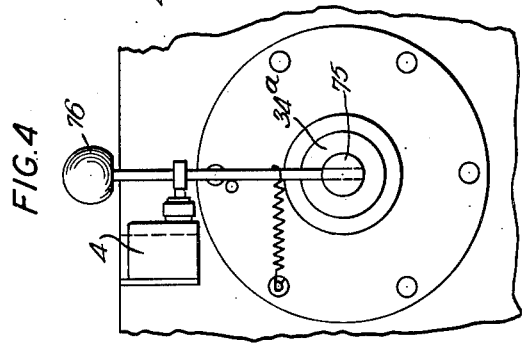
Fig. 4 is a partial end view of Fig. 3.

The boring tool heads 20 and 21, see also Fig. 3, comprise spindles 60 upon which are mounted suitable boring tools 61 for finishing the wrist pin holes 42 in a pair of pistons 40 in the boring position and rotatably driven by suitable power means, such as electric motors 62 driving through pulleys and belting indicated at 73. The boring heads 20 and 21 and their driving mechanisms are mounted respectively on suitable tables 63 and 64 to feed slidably toward and away from each other on the slideways 16 and 17 to engage and disengage the tools 61 each with a piston 40 of a pair in boring position represented by the pistons 40 in the clamps 35c. As can best be understood from the drawings, it is seen that the direction of feed of the tools 61 is generally at right angles to the axes of the pistons 40 and, therefore, to the axis of the finished peripheral surface which has been turned; see also Figs. 6–10. It is to be noted that the usual wrist pin hole 42 comprises two parts 42a and 42b with an air space between. The assemblies on the tables 63 and 64 including the tools 61 are moved toward and away from the work by fluid pressure means including pistons 65 and 66 operating in cylinders 67 and 68, these assemblies being suitably connected between the tables 63 and 64 and the bed portions 10a and 10b, respectively. Fluid pressure is supplied through lines 183, 185 and 184, 186 to operate the pistons as will be described. The tool heads 20 and 21 can be adjustably positioned with respect to their tables 63 and 64 in order to position the finished wrist pin holes with respect to the peripheral surfaces. In modern practice, these are usually slightly off center with respect to the piston axis, as indicated in Figs. 8 and 9.

*Clamping mechanism*

Referring to Figs. 1–3, and 11–24, the clamping mechanism 25 is rotated step by step in increments of 120° to move successive pairs of pistons between the loading position, the turning position and the boring position by fluid pressure mechanism, indicated at 70, see particularly Figs. 3, 21, 22 and 24.

The clamping mechanism hub 30 is supported in the bearings 32 and 33 in the frame 26 by end members 34 and 36 to which it is bolted, the member 34 and hub 30 being hollow to accommodate a control shaft 75 having a manually operable lever 76 fixed on its left hand end as viewed in Fig. 3 and a pair of cams 77 for raising and lowering the clamp mechanisms 35 when the latter are in the piston loading and unloading position as will be described in detail.

As best viewed in Figs. 11–13, the hub 30 is triangular in cross section and has three flat faces 80 each having a pair of triangularly shaped recesses 81. The hub 30 has a hollow central portion 82 to accommodate the control shaft 75 and connected by holes 83 with each of the recesses 81. A piston clamp assembly 35 is mounted over each recess 81, there being a pair of piston clamps 35 on each face 80 of the hub 30.

Each clamp assembly 35, see Figs. 16–20, comprises a fixed base portion 85 bolted to the face 80 of the hub 30 over an aperture 81. Slidably fitted radially of the hub 30 in a hole 87 is a cam follower member 88 having a cam follower 89 in contact with the control shaft 75 and a collar portion 90 against which is fitted a clamp lifting member 92 slidably guided radially of the hub in the aperture 81 by a pin 94 which is fixed to the hub in the aperture. A plurality of clamp fingers 95, protruding above the base 85 are mounted each on a stub shaft 98 which is rotatable in the clamp base and they are adapted to swing in and out to grip a piston 40 by one of its ring grooves 41. On the bottom of each of the stub shafts 98 is an integral gear 99 engaged by the toothed portion of a relatively rotatable clamp operating ring 101 having a convenient handle 102 for manual rotation relative to the clamp base 85. The stub shafts 98 and integral clamp fingers 95 are also slidable lengthwise relative to the clamp base 85 by a small amount and each has a lengthwise adjustably positioned pin 104 in contact with a face 105 of the clamp lifting member 92. Each clamping finger 95 is held yieldingly downward against the lifting member 92 by a strong spring 107 urging against a collar formed by the gear 99 on the stub shaft 98 at one end and against the base structure 85 at the other.

During the progressive rotation of the clamp mechanism 25 around the clamp lifting shaft 75, the cam rolls 89 are in contact with the surface of the shaft and the lifting member 92 and lifting fingers 95 are in down or clamping position, but when a clamp 35 is in the loading position indicated by the clamp 35a in Figs. 11 and 17, the cam roll 89 rides up on the lifting cam 77 and forces the lifting member 92, the stubs 98 and the clamping fingers 95 slightly outwardly so that the fingers 95 will clear the shoulder formed by the ring groove 41 of a piston in order more easily to enter the ring groove while the piston 40 is being clamped. In the lifted condition of the fingers 95 the clamp ring 101 can be easily rotated by its handle 102, thereby swinging the clamp fingers 95 in and out of the ring groove 41 of the piston while the latter is being loaded and unloaded in the clamping mechanism.

Radially disposed in the center of each clamp 35 is a centering pin 110 yieldably slidable inwardly in the clamp base 85 against a spring 112 received in a bore 113 in the cam follower member 88, and which is adapted to be received in a hole 115 which has been bored in the center of the top of the piston 40 for the purpose of centering and positioning the piston in the clamp mechanism 35, a plurality of positioning lugs 96 being also provided on the base for rough positioning of the workpiece. An adjustable pin 116 in the base 85 is also adapted to be received in a hole 117 radially disposed from the hole 115 in the piston head in order to orient the piston about its axis while it is being positioned in the clamp in order to position the piston 40 with respect to the turning and boring tools so that the finished peripheral surface 43 and wrist pin hole 42 will bear the desired predetermined relation with the piston.

When a piston is being loaded in a clamp at the loading position represented by the clamp 35a, the clamp ring 101 has been rotated by means of its handle 102 to move the clamp finger 95 rotatably to their open position, and the cam roll 89 being in raised position over the cam 77, the fingers 95 are also slightly raised with respect to the surface 120 against which the piston bears when it is clamped. A piston may then be placed against the surface 120 with its positioning holes 115 and 117 over the pins 110 and 116, respectively, in which position its axis will be parallel to the direction of feed of the tools 12 when it comes to the turning position and normal to the direction of feed of the boring tools 20 when it comes to the boring position. The handle 102 of the clamping ring 101 is then rotated by the operator so as to enter the clamping fingers 95 in an appropriate ring groove 41 of the piston. The operator then moves the lever 76 toward him, Figs. 1 and 3, or in a counterclockwise direction as viewed in Figs. 11 and 17, thereby moving the cam 77 out from under the cam roll 89 and allowing the clamp fingers 95 to move downwardly toward the clamp base 85 and against the shoulder formed on the piston by the ring groove 41 under the force of the springs 107. Additional means are also provided to locate and orient each piston exactly in a clamp at the loading position comprising a manually operated locator arm 125 pivotally mounted at 126 on the top of the frame 26 and having a pair of locator pins 127 adapted to engage in locating holes 128 which have been preformed in a pad 129 under the piston 40 and in a line parallel to the wrist pin hole. The locator pins 127 are momentarily entered in the holes 128 while the piston is being positioned in the clamp by downward movement of arm 125 after which the arm is allowed to return under tension of a suitable spring 124 to its normal dotted line position as shown in Fig. 11 before the cycle is started.

The cycle is started by pressing a switch as further described, and the clamping mechanism 25 is rotated one step to move the piston from the loading to the turning position after which the operator releases the handle 76 to return the cam 77 to its normal position under a clamp 35 at the loading position, thus raising the fingers 95 on the next successive clamp so that they can be opened to release and unload a finished piston.

It is to be understood that while the mechanism of a single clamp 35 has been described, the description applies to each of three pairs of the clamps 35, each operation, i. e. loading, turning and boring, being carried on simultaneously with respect to both of a pair of pistons at a time, six pistons being accommodated at a time.

The operating mechanism 70 for rotating the clamp mechanism 25, best seen in Figs. 3 and 21–24, comprises a fluid pressure cylinder 130 containing a piston 131 connected by a link 132 to a rotatably reciprocable crank member 133 having a pawl 135 engageable successively with each of three notches 136 in a circular plate 138 which is fast to the hub 30 of the clamp mechanism 25 through the end member 36 which, in turn, has an integral flange 139 by which it is bolted to the hub 30. Therefore, as viewed in Fig. 21, movement of the piston 131 from left to right causes the pawl 135 to engage a notch 136 and to rotate the plate 138 and clamping mechanism clockwise 120° to index the workpieces, and retraction of the piston to the left repositions the pawl 135 to engage the next succeeding notch 136 for a successive rotative step. Fluid pressure is controlled and supplied through lines 140 and 141 to the cylinder 130 as will be described.

A lock finger 145 pivoted at 146 is adapted to be received successively in each of three notches 147 spaced at 120° in the periphery of the plate 138 to lock the plate and clamping mechanism in a fixed indexed position under the pressure of a plunger 150 connected to a piston 151 in a fluid pressure operated cylinder 152. Pressure is exerted on the right hand side of the piston 151, as viewed in Fig. 21, to force the plunger 150 against the lock finger 145 and to keep it in one of the notches 147 when the clamping mechanism is in a given indexed position, but while the clamp mechanism is being rotated by the piston 131 the pressure is relieved behind the piston 151, and a spring 157 retracts it sufficiently to allow the lock finger 145 to ride on the periphery of the plate 138 under the yieldable pressure of a plunger 153 and spring 154. Fluid pressure is controlled and fed to the piston 152 through a line 142 in timed relation with the rotation of the clamping mechanism as will be further described. The plunger 150 has a cut-away cam portion 155 engaging a vertically slidable plunger 156 to operate a control switch 7 during inward and outward movement of the plunger 150. A cam plate 160 having a cam surface portion 161 is mounted to rotate with the plate 138 to raise a vertically slidable plunger 163 when the piston 131 moves to the right and thus to operate a switch 6. Operation of these switches will be further described.

*Fluid pressure system*

Figure 24:
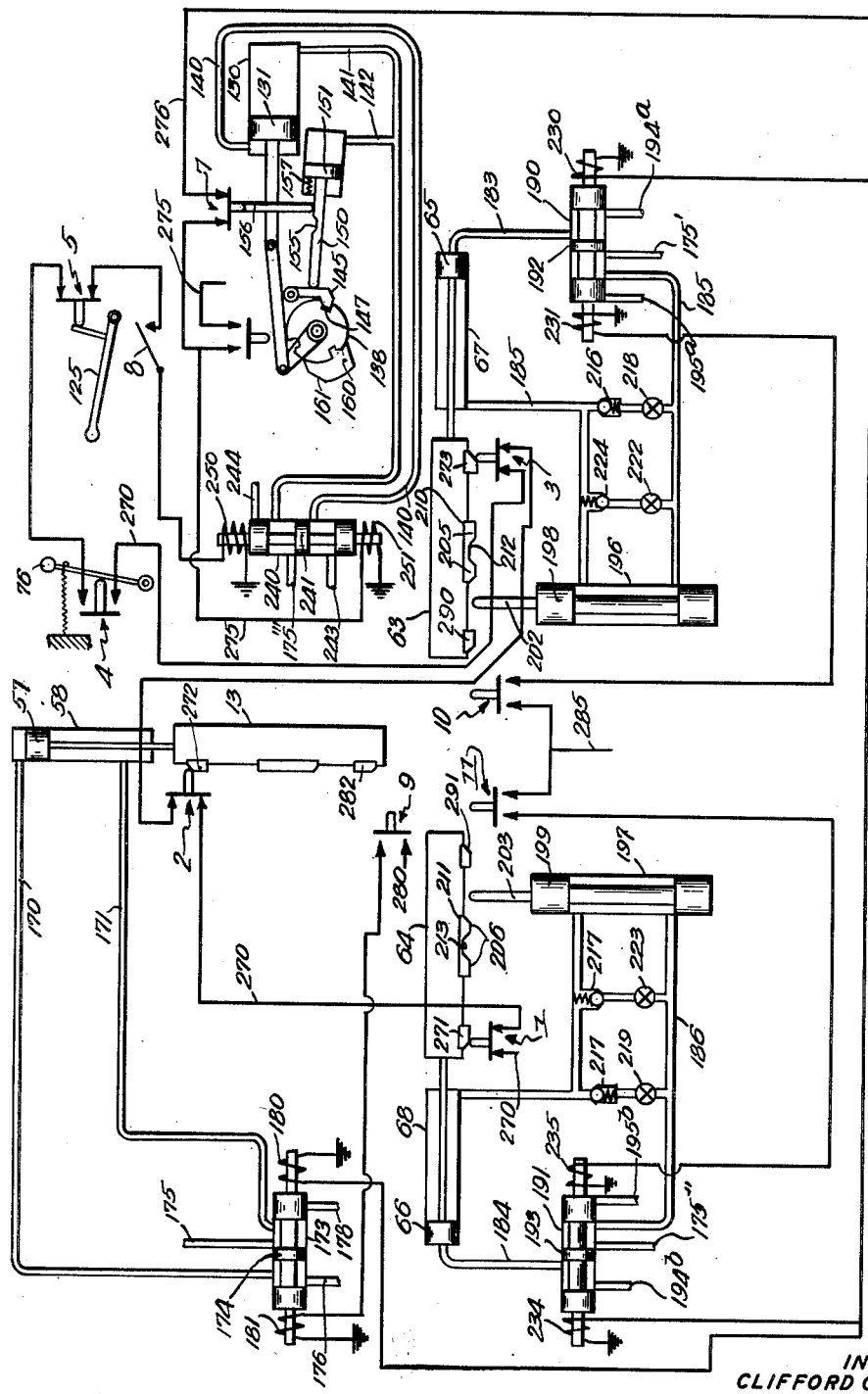
Fig. 24 is a schematic drawing of the fluid pressure operating system and the electrical control system.

Referring to Fig. 24, the turning tool table 13 is fed inwardly or downwardly as shown in the drawing to engage the tools 52 with the work by fluid under pressure in a line 170 introduced to the cylinder 58 above the piston 57, the fluid below the piston exhausting through a line 171. Retraction of the tools from the work occurs by a reversal of pressure and exhaust in the lines 170 and 171, and the piston 57 remains in a normally retracted position with pressure in the line 171 except when the tools are being fed into the work.

Pressure and exhaust in the lines 170 and 171 are controlled by a valve 173 having a plunger 174 which is normally in a left-hand position, as shown, to allow fluid pressure from a line 175 from any suitable fluid pressure source such as a pressure pump (not shown) to flow to the line 171 to retract the table, and in this position also to allow exhaust fluid from the line 170 to flow across the valve and through a suitable exhaust or return line 176. When the plunger 174 is moved to the right, the pressure flow from the line 175 crosses the valve into the line 170 to feed the table, and exhaust fluid from the line 171 crosses the valve and into an exhaust or return line 178, the exhaust line 176 being closed in this condition.

An electric control system to be further described includes a solenoid 180 which moves the plunger 174 to the right to feed the turning tools on the table 13 into the work and a solenoid 181 which moves the plunger 174 to the left to retract these tools from the work, the solenoids being energized sequentially in the cycle of operation at predetermined points.

The boring tool tables 63 and 64 are fed and retracted with respect to their work pieces by fluid pressure admitted to the cylinders 67 and 68 through lines 183 and 184, respectively, the fluid on the opposite sides of the pistons 65 and 66 exhausting through the lines 185 and 186. Reversal of pressure and exhaust in the lines 183 and 185, and 184 and 186 retracts the tables 63 and 64.

The direction of flow of fluid pressure in these lines is controlled by valves 190 and 191 having plungers 192 and 193. When the plunger 192 is moved to the left in its position, as shown, fluid under pressure from a suitable source through a pressure line 175' flows across the valve 190 and into the line 185 to retract the table 63, fluid on the right-hand side of the piston 65 exhausting through the line 183 and across the line 190 to a suitable exhaust or return line 194a. When the plunger 192 is moved to the right, pressure from the line 175' crosses the valve into the line 183, fluid from cylinder 67 exhausting through the line 185 and across the valve 190 to a suitable exhaust line 195a, the line 194a being closed. The function of the plunger and the valve 191 is the same in controlling pressure and exhaust in the lines 184 and 186 with a suitable pressure line 175'' and exhaust lines 194b and 195b connected to the valve 191, except that movement of the plunger 193 is in the opposite direction, i. e. to the left to admit pressure to the line 184 to feed the table 64 and to the right to admit pressure to the line 186 to retract the table 64.

The lines 185 and 186 pass through normally open speed control valves 196 and 197, respectively, having plungers 198 and 199, each having an extension 202 and 203. As the boring tool tables 63 and 64 are fed into the work, the plunger extensions 202 and 203 are contacted by high points 205 and 206 of cams 210 and 211 on the tables 63 and 64, respectively, to momentarily close the valves 196 and 197, the valves being momentarily opened during the passage of the low points 212 and 213 over the plunger extensions to speed up the traverse of the tools between the parts 42a and 42b of the wrist pin holes, see Fig. 8. When the valves 196 and 197 are closed and the tables 63 and 64 are feeding toward the work, the fluid exhausting through the lines 185 and 186 passes through check valves 216 and 217 and is metered through needle valves 218 and 219 which bypass the valves 196 and 197 in the lines 185 and 186, respectively, thus providing a rapid traverse feed when the valves 196 and 197 are open, and a slow valve feed when the valves 196 and 197 are closed by the cams 210 and 211 while the tools are in contact with the parts 42a and 42b of the workpiece. When the boring tool tables 63 and 64 are being retracted from the work by pressure in the lines 185 and 186, the fluid is metered through needle valves 222 and 223, passing through check valves 224 and 225, bypassing the valves 196 and 197 when the latter are closed, thus also providing a slow outfeed and a rapid traverse controlled by the cams 210 and 211.

The valve plunger 192 is moved to the right to feed the table 63 to the work by a solenoid 230 and to the left to retract the table by a solenoid 231, and the plunger 193 is moved to the left to feed the table 64 by a solenoid 234 and to the right to retract it by a solenoid 235, these solenoids also being energized in timed sequence with the cycle of the machine.

The direction of flow of fluid under pressure in the lines 140 and 141 to the cylinder 130 to index the clamping mechanism 25 in successive steps is controlled by a valve 240 having a plunger 241 which in its normal downward position as shown allows fluid to flow from a suitable pressure line 175''' across the valve and into the line 141 to retract the piston 131 to the left ready to index the clamping mechanism on a successive operation. The fluid exhausting through the line 140 crosses the valve 240 into an exhaust line 243. When the plunger 241 is moved upwardly, fluid under pressure crosses the valve from the line 175''' into the line 140 to move the piston 131 to the right to index the clamping mechanism to a new position, the fluid exhausting through the line 141 and across the valve 240 through a suitable exhaust line 244, the line 243 being closed.

When the piston 131 is in retracted position to the left with pressure in the line 141, pressure is also exerted through the line 142 against the piston 151 in the cylinder 152 to hold the locking finger 145 in locked position in one of the notches 147 on the plate 138, the clamping mechanism thereby being held in locked position. When, however, pressure is exerted in the line 140 to index the clamping mechanism, the lines 141 and 142 therefore being opened to exhaust, the pressure in the cylinder 152 is released and the piston 151 is retracted under the force of the spring 157 to relieve the locking finger 145 so that the clamping mechanism and plate 138 may be indexed to the next operative position. The mechanism is again locked when pressure is shifted to the lines 141 and 142 to retract the piston 131.

The valve plunger 241 is moved up to index the clamping mechanism by a solenoid 250 and down to reposition the indexing mechanism by a solenoid 251, energized successively in time with the cycle.

Electric control mechanism

The solenoid 250 is first energized to index the clamping mechanism by power from a suitable power source line 270 which passes through a series of switches 1, 2, 3, 5 and 8, see Fig. 24. The switches 1, 2 and 3 are closed when all of the tool tables 13, 63 and 64 are in fully retracted position, by cams 271, 272 and 273 on these tables, these switches being otherwise normally open. The normally open switch 4 is closed when the operator moves the lever 76 toward the front of the machine to complete the clamping of the new work pieces as has been described. The switch 5 is closed after the operator releases the locator arm 125 which carries the positioning pins 127 to position the work as has also been described. The operator then momentarily closes the starting switch 8 and the solenoid 250 is energized to start the cycle.

The solenoid 251 is then energized to retract the indexing mechanism 70 and the solenoids 230, 234 and 180 are then energized to feed all of the tools toward the respective workpieces by power from a suitable source line 275, the power to the solenoid 251 flowing directly through a switch 6, and the power to the tool feed solenoids 230, 234 and 180 flowing also through switch 7 and a line 276.

When the indexing piston 131 moves to the right, the cam surface 161 closes the switch 6, thus energizing the solenoid 251 and reversing the fluid flow to the cylinder 130 and starting the piston 131 back to the left. The cam surface 161 remains in contact with the switch 6 long enough to keep it closed during part of this piston motion to the left. Pressure also being exerted on the piston 151, the switch operating plunger 156 is forced out of the cam surface or detent 155 and raises to close the switch 7, thus completing the circuit to the feed control solenoids 230, 234 and 180. All of the tools are fed toward the work under rapid traverse and slow feed control as previously described, and the piston 131 having completed its retracting movement, the circuit to all of the previously energized solenoids is broken by the opening of the switch 6.

When the turning tool table 13 has completed its infeed cycle, the solenoid 181 is energized to retract the table by power from a suitable source line 200 passing through a switch 9, which is closed by a cam 282 on the table 13 at the completion of in-feed. In similar fashion, the solenoids 231 and 235 are energized to retract the tables 63 and 64 by power from a suitable source line 285 passing through switches 10 and 11 which are closed by cams 290 and 291 on the tables 63 and 64, respectively. When all of the tool tables are fully retracted, the circuits are again in condition for the next cycle of operation.

Operation

In summary, the operator places a pair of work piece pistons 40 in clamps 35a and 35b which are in the loading position. He positions them precisely in the clamps by placing them over the locating pins 110 and 116, and by operation of the locator arm 125 which places the positioning pins 127 in the positioning holes 128 of the respective work pieces. He then rotates the clamp mechanism handles 102 which moves the clamp fingers 95 into the ring grooves 41 of the work pieces. He then completes the clamping operation by movement of the clamping lever 76, at the same time releasing and raising the locator arm 125. While holding the clamping lever 76 toward him, he then closes the starting switch 8 and the clamping mechanism 25 is indexed 120° to place the new work pieces in position with respect to the turning tool heads 12 and which, at the same time, returns a pair of finished pieces from the boring station to the loading station. The indexing mechanism 70, i. e., the piston 131 returns to retracted position and the turning and boring tool feed cycle starts and is completed automatically as described above and during which time the operator may replace the finished pieces by a pair of new pieces at the loading station preparatory to the starting of a new cycle which, of course, can be started as soon as all of the tool tables are again fully retracted.

The number of workpiece clamps and tools may be increased or diminished without departing from the scope of the invention. The machine may also be arranged so that the feeding of the tools and their application to the work is not automatically responsive to the completion of the indexing operation, but responsive to a second manual starting operation such as the closing of a switch. Such an arrangement gives the operator more time to inspect the work just before the tools are applied. With the latter arrangement it is, of course, preferable to arrange the machine so that the tools cannot be applied to the work until after the indexing operation is completed, and the clamping mechanism locked in place.

We claim:

1. A machine for producing a peripheral surface and an internal wrist pin hole surface, said surfaces having a predetermined accurate relation to each other in each of a succession of pistons, said machine comprising work clamping mechanism having a plurality of piston clamps in spaced relation, a turning tool and a boring tool each operable upon different successive pistons in said clamps, said clamping mechanism being movable step-by-step to index each of said clamps from a clamp loading position to said turning and boring tools successively, locating means operable at said loading position for accurately orienting said pistons in said clamps, said locating means including positioning pins engageable with preformed holes in said pistons and means preventing movement of clamping mechanism until after retraction of said locating means.

2. A machine for producing a peripheral surface and an internal wrist pin hole surface, said surfaces having a predetermined accurate relation to each other in each of a succession of pistons, said machine comprising work clamping mechanism having a plurality of piston clamps in spaced relation, a turning tool and a boring tool each operable upon different successive pistons in said clamps, said clamping mechanism being movable step-by-step to index each of said clamps from a clamp loading position to said turning and boring tools successively, means to open and close said clamps at said loading position to replace said finished work pieces with raw work pieces and means preventing movement of said clamping mechanism when said clamps are open.

3. A machine for producing a peripheral surface and an internal wrist pin hole surface, said surfaces having a predetermined accurate relation to each other in each of a plurality of pistons comprising successive groups of work pieces, said machine comprising work clamping mechanism having a plurality of groups of piston clamps, said groups being in spaced relation, turning tools simultaneously operable on work pieces in each clamp of a group and boring tools operable simultaneously with the turning tools and with each other upon work pieces in each clamp of a different group, operating means to move said clamping mechanism step-by-step to index each of said groups of clamps successively from a clamp loading position to said turning and boring tools and back again, locating means engageable with said work pieces for accurately orienting successive pistons in said clamps, said operating means being inoperative except after retraction of said locating means, and means operable after each progressive movement of said clamping mechanism to apply said tools to the pistons in successive groups.

CLIFFORD G. MENARD.
JOHN J. McCABE.

References Cited in the file of this patent

UNITED STATES PATENTS

| Number | Name | Date |
|---|---|---|
| 1,434,876 | De Fries | Nov. 7, 1922 |
| 1,453,732 | Stevens | May 1, 1923 |
| 1,905,094 | Hirvonen | Apr. 25, 1933 |
| 2,121,934 | Snader et al. | June 28, 1938 |
| 2,215,369 | Gabriel | Sept. 17, 1940 |
| 2,298,077 | Witter | Oct. 6, 1942 |